US012408654B2

(12) United States Patent
Hu

(10) Patent No.: US 12,408,654 B2
(45) Date of Patent: Sep. 9, 2025

(54) ANIMAL REPELLING DEVICE

(71) Applicant: Shenzhen Visson Technology Co., Ltd., Shenzhen (CN)

(72) Inventor: Guoqing Hu, Shenzhen (CN)

(73) Assignee: Shenzhen Visson Technology Co., Ltd., Shenzhen (CN)

( * ) Notice: Subject to any disclaimer, the term of this patent is extended or adjusted under 35 U.S.C. 154(b) by 359 days.

(21) Appl. No.: 17/991,852

(22) Filed: Nov. 22, 2022

(65) Prior Publication Data

US 2024/0164365 A1   May 23, 2024

(51) Int. Cl.
*A01M 29/18* (2011.01)

(52) U.S. Cl.
CPC .................. *A01M 29/18* (2013.01)

(58) Field of Classification Search
CPC .............................. A01M 29/18; A01M 29/16
USPC ........................................................ 367/139
See application file for complete search history.

(56) References Cited

U.S. PATENT DOCUMENTS

| | | | | |
|---|---|---|---|---|
| 756,640 A * | 4/1904 | Irons | ....................... | E02D 5/801 52/156 |
| 897,787 A * | 9/1908 | Ryan | ......................... | E02D 5/80 52/156 |
| 2,343,350 A * | 3/1944 | Warren | ..................... | B64F 1/12 52/156 |
| 3,799,105 A * | 3/1974 | Porter | .................. | A01M 29/06 446/178 |
| 4,044,513 A * | 8/1977 | Deike | ..................... | E02D 5/803 405/259.5 |
| 4,320,608 A * | 3/1982 | Deike | ................. | E04H 12/2215 52/165 |
| 4,566,085 A * | 1/1986 | Weinberg | .............. | B06B 1/0276 116/22 A |
| 4,890,571 A * | 1/1990 | Gaskill | ................. | A01M 31/00 428/905 |
| 5,148,621 A * | 9/1992 | Rosen | .................... | A01M 29/06 43/1 |
| 5,602,523 A * | 2/1997 | Turchioe | .................. | G08B 3/10 340/384.1 |
| 5,894,818 A * | 4/1999 | Betzen | .................. | A01M 23/38 119/712 |
| 6,272,798 B1 * | 8/2001 | Cockman | ................ | E02D 5/801 248/521 |

(Continued)

FOREIGN PATENT DOCUMENTS

EP            4343084 A1 *   3/2024    ............. E02D 27/42

*Primary Examiner* — Daniel L Murphy
*Assistant Examiner* — Amie N Ndure
(74) *Attorney, Agent, or Firm* — Jose Cherson Weissbrot

(57) ABSTRACT

The present invention provides an animal repelling device, which comprises a connecting rod, a sound wave generator, a power supply system and an insertion end, wherein a center line X is defined along the insertion direction of the insertion end, and a tab group is arranged on the surface of the insertion end, wherein the tab group is composed of mutually parallel tabs extending outward from the surface of the insertion end, and the extension direction defines an extension line Y, which forms an included angle with the center line X of the insertion end, and the tabs are distributed around the surface of the insertion end. The animal repelling device can effectively repel rodents such as mice and snakes by generating longitudinal waves to simulate seismic waves.

8 Claims, 11 Drawing Sheets

(56) References Cited

U.S. PATENT DOCUMENTS

| | | | | |
|---|---|---|---|---|
| 6,460,487 B1* | 10/2002 | Betzen | A01M 31/008 | 119/719 |
| 7,173,534 B1* | 2/2007 | Markham | A01M 31/002 | 340/573.2 |
| 7,278,375 B2* | 10/2007 | Ross | A01M 29/12 | 116/22 A |
| 10,398,130 B2* | 9/2019 | Birch | A01K 11/006 | |
| 2002/0088186 A1* | 7/2002 | Cusimano | E02D 27/50 | 52/149 |
| 2005/0102926 A1* | 5/2005 | Carte | E02D 17/207 | 52/157 |
| 2005/0120975 A1* | 6/2005 | Kondo | A01M 29/12 | 119/713 |
| 2005/0211186 A1* | 9/2005 | Arnold | A01M 29/24 | 340/573.2 |
| 2006/0225668 A1* | 10/2006 | Ross | A01M 31/002 | 119/719 |
| 2009/0126651 A1* | 5/2009 | Riddell | A01M 29/26 | 43/1 |
| 2011/0229274 A1* | 9/2011 | Taylor | B23K 11/002 | 405/262 |
| 2013/0031850 A1* | 2/2013 | Dickinson | E04H 13/003 | 52/741.15 |
| 2014/0053788 A1* | 2/2014 | Riddell | A01M 29/26 | 119/712 |
| 2016/0286785 A1* | 10/2016 | Nichols | A01M 29/10 | |

* cited by examiner

ANIMAL REPELLING DEVICE

TECHNICAL FIELD

The present invention relates to the field of animal repelling, in particular to an animal repelling device by ultrasonic waves.

BACKGROUND

Rats, snakes and other rodents often appear in farmland, lawns and gardens. They move under the ground and seriously endanger the safety of plants and human beings. Out of the humanitarian spirit, people tend to repel away to reduce the harm of these animals. At present, a kind of sound wave generator which can be inserted into the ground is widely used in the market, which simulates seismic sound waves to repel away animals under the ground. This method is convenient, sanitary and in line with the humanitarian spirit. For example, patent U.S. Ser. No. 10/028,502B2 discloses a device that uses ultrasonic waves to repel animals under the ground. The sound wave generator simulates seismic sound waves, so that animals hiding under the ground are frightened and flee.

In the prior art, because the motor drives the insertion rod to vibrate left and right in the soil, it is the sound wave that propagates along the direction perpendicular to the vibration direction. This kind of sound wave is the type of shear wave in ultrasonic waves. When propagating shear wave, the propagation medium is subjected to shear stress and produces elastic deformation to realize the propagation of shear wave, so only solid can propagate shear wave. However, the soil of garden or lawn is a mixture of air, water and sediment. When the shear wave leaves the insertion rod and propagates into the soil, its propagation ability will be rapidly reduced, so that the prior art's goal of expelling animals by ultrasonic waves is difficult to achieve.

SUMMARY

The technical problem to be solved by the present invention is to provide an animal repelling device which can expand the propagation range of ultrasonic waves in soil.

In order to solve the above technical problems, the present invention provides an animal repelling device, which includes a connecting rod, a sound wave generator, a power supply system, and an insertion end, wherein a center line X is defined along the insertion direction of the insertion end, and a surface of the insertion end is provided with a tab group; a tab group is arranged on the surface of the insertion end, and the tab group is composed of mutually parallel tabs extending outward from the surface of the insertion end; the extension direction defines an extension line Y, which forms an included angle with the center line X of the insertion end, and the tabs are distributed around the surface of the insertion end.

As the insertion rod is provided with a tab with different directions from the center line X, when the insertion rod vibrates left and right, it will drive the tab to vibrate left and right, thus forming a longitudinal wave with the same propagation direction as the tab vibration direction. As the longitudinal wave is generated when the medium is subjected to alternating tensile and compressive stress, and the vibration direction of the medium is the same as the propagation direction of the wave, the longitudinal wave can propagate in solid, liquid and gas or their mixture, thus expanding the propagation range of ultrasonic waves in soil.

In a possible embodiment, the tab has a first end and a second end, and when the first end and the second end are in the same circumferential surface and extend toward each other around the surface of the insertion end, the first end and the second end overlap to form a complete circular tab.

In a possible embodiment, the tab has a first end and a second end, and when the first end and the second end are in different circumferential surfaces and extend toward each other around the surface of the insertion end, a screw-shaped tab is formed.

In a possible embodiment, the center line X of the insertion end forms an included angle R with the axis of the connecting rod, and the angle range of the included angle R is 0°<R<180°.

In a possible embodiment, the extension line Y of the tab forms an included angle R' with the surface of the insertion end, and the angle range of the included angle R' is 0°<R'<180°.

In a possible embodiment, the center line X of the insertion end is parallel or coincident with the axis of the connecting rod.

BRIEF DESCRIPTION OF DRAWINGS

In order to explain the technical solution of this application more clearly, the following will briefly introduce the drawings that need to be used in the embodiments. Obviously, the drawings in the following description are only some embodiments of this application. For those of ordinary skill in this field, other drawings can be obtained according to these drawings without any creative effort.

Figure 1:
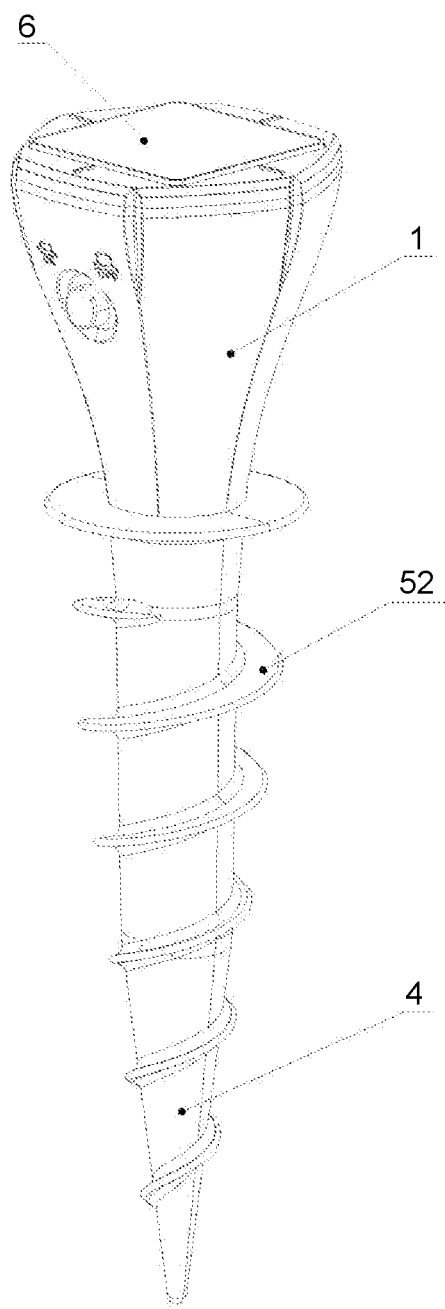
FIG. 1 is a perspective view of an animal repelling device of the present invention.

In the figures:
1. Connecting rod;
2. Sound wave generator;
3. Power supply system;
4. Insertion end;
5. Tab group;
51. Tab;
511. First end;
512. Second end;
52. Screw-shaped tab;
53. Round tab;
6. Solar panel;
7. Upper cover;
8. Base;

9. Energy storage battery;
10. Control circuit board;
11. Button assembly;
12. Protrusion;
13. Groove;
14. Clamping seat;
15. Motor;
16. Motor mounting seat;
17. Mounting slot;
X. Center line;
Y. Extension line;
R. Included angle between the center line and the axis of the connecting rod;
R'. Included angle between the extension line and the surface of the insertion end.

DESCRIPTION OF EMBODIMENTS

Ultrasonic is a mechanical wave in sound waves, because its fluctuation frequency is generally between 20 kHz and 1000 kHz, which is higher than the auditory range of human ears, so it is called ultrasonic. Mechanical wave refers to the process of vibration propagation in an elastic medium. The elastic medium refers to the medium in which each particle in the medium is connected together by elastic force, and can recover its original shape when subjected to an external force.

According to the vibration form and direction of ultrasonic waves, they can be divided into transverse waves and longitudinal waves. Transverse wave refers to the vibration motion of the solid elastic medium under the action of alternating shear stress, which is perpendicular to the direction of wave propagation. When propagating shear waves, the propagation medium is subjected to shear stress and produces elastic deformation, thus realizing the propagation of shear waves. Therefore, only solids can propagate shear waves. The longitudinal wave means that when the elastic medium is subjected to alternating tensile and compressive stress, the vibration direction of the particle is the same as the propagation direction of the wave.

Among them, the propagation speed of the shear wave and longitudinal wave is:

$$V_p = \sqrt{\frac{\lambda + 2G}{\rho}}$$

$$V_s = \sqrt{\frac{G}{\rho}}$$

where: $\rho$—the density of the elastic medium.)
$\lambda$ and G—the Lame constants of the elastic medium.
$V_s$—the sound speed of the shear wave.
$V_p$—the sound speed of the longitudinal wave.

It can be seen from the above that the propagation speed of longitudinal wave is greater than that of shear wave when the density of elastic medium is the same.

In the process of ultrasonic propagation, the propagation path and speed will be affected by the propagation medium. As a three-phase substance, soil is composed of soil particles, air and water. In the natural environment, it is affected by sedimentation, cracking and rainfall, which makes it impossible for soil to be used as an ideal transmission medium.

It is assumed that the solid, liquid and gas phases in the soil are uniformly distributed, macroscopically homogeneous and isotropic. Ignoring the flow of liquid phase and gas phase in the soil between the pores of soil particles, the soil is only vibrated by ultrasonic waves.

For the spatial coordinate $X_a$ of a particle in unsaturated soil (the particle is a three-phase mixture of solid phase, liquid phase and gas phase, $X_a$(a=s,l,g), respectively representing solid phase, liquid phase and gas phase) at time t, the vibration caused by ultrasonic wave can be described as $$x = x(X, t)$$

The particle displacement of each phase in soil is $$u_a(x,t) = \chi_a(X_a, t) - X_a$$

The corresponding velocity and acceleration are the first derivative and the second derivative of the displacement versus time.

$$v_a(x, t) = \frac{\partial u_a(x, t)}{\partial t}$$

$$a_a(x, t) = \frac{\partial v_a(x, t)}{\partial t}$$

The displacement of the liquid phase and gas phase substances in soil pores relative to soil particle skeleton is $$u_a^r(x,t) = u_a(x,t) - u_s(x,t) \ldots (a=l,g)$$

The relative displacement of the liquid and gas phase substances described by Euler is $$w_a(x, t) = \frac{\partial u_a^r(x, t)}{\partial t} = v_a(x, t) - v_s(x, t) \ldots (a = l, g)$$

The equation of motion of the medium is obtained.

$$\rho \frac{dv_a(x, t)}{dt} = -\frac{\partial p}{\partial u_a^r(x, t)},$$

where p is the sound pressure of the particle.
$\rho$ is the particle density.

This formula represents the relationship between the sound pressure, vibration speed and acceleration of unsaturated soil medium at a certain point under the action of ultrasonic waves. Among them, the density of a particle can be decomposed into two parts.

$$\rho = \rho_o + \rho'$$

where $\rho_o$ is the static density
$\rho'$ is the density change of the particle under the action of sound pressure, which is a variable related to time.

Therefore, the particle density can also be expressed as $\rho^{(x,t)}$, which is the density at position x at time t. It is substituted into the equation of motion of the medium.

$$\rho(x, t) \frac{dv_a(x, t)}{dt} = -\frac{\partial p}{\partial u_a^r(x, t)}$$

From the above equation of motion, it can be seen that the propagation of ultrasonic waves is mainly related to mechanical parameters such as ultrasonic sound pressure, elastic modulus of media, Poisson's ratio, etc. Therefore, the propagation speed and attenuation coefficient of the ultrasonic wave in soil are related to the indexes that affect the mechanical properties such as soil structural components.

Based on the above theory, the present invention provides an animal repelling device, which generates longitudinal waves through vibration to repel animals.

The technical solutions in the embodiments of this application will be clearly and completely described below with reference to the drawings in the embodiments of this application. Obviously, the described embodiments are only part of the embodiments of this application, but not all of them. Based on the embodiments in this application, all other embodiments obtained by ordinary technicians in this field without creative labor are within the scope of protection in this application.

The reference to "an embodiment" or "an implementation" here means that a specific feature, structure or characteristic described in connection with an embodiment or an implementation can be included in at least one embodiment of this application. The appearance of this phrase in various places in the specification does not necessarily refer to the same embodiment, nor is it an independent or alternative embodiment mutually exclusive with other embodiments. It is understood explicitly and implicitly by those skilled in the art that the embodiments described herein can be combined with other embodiments.

In this specification, for convenience, words such as middle, upper, lower, front, rear, vertical, horizontal, top, bottom, inside and outside are used to illustrate the positional relationship of constituent elements with reference to the drawings, only for convenience of description. The positional relationship of the constituent elements is appropriately changed according to the direction of the described constituent elements. Therefore, it is not limited to the words and expressions described in the specification, but can be appropriately changed according to the situation.

In this specification, unless otherwise specified and limited, the terms "installation", "joint" and "connection" should be understood broadly. For embodiment, it can be fixedly connected, detachably connected, or integrally connected: it can be mechanically connected or electrically connected: it can be directly connected, indirectly connected through middleware, or the internal communication of two elements. For those of ordinary skill in the art, the meanings of the above terms in this disclosure can be understood according to the situation.

In Embodiment 1, as shown in FIGS. 1-6, an animal repelling device of the present invention includes a connecting rod 1, a sound wave generator 2, a power supply system 3, and an insertion end 4, wherein a center line X is defined along the insertion direction of the insertion end 4, and the surface of the insertion end 4 is provided with a tab group 5: the tab group 5 is composed of mutually parallel tabs 51 extending outward from the surface of the insertion end 4: the extension direction defines an extension line Y, which forms an included angle with the center line X of the insertion end 4, and the tabs 51 are distributed around the surface of the insertion end.

In this embodiment, the connecting rod 1 is arranged above the insertion end 4, and the center line X of the insertion end 4 coincides with the axis of the connecting rod 1.

Figure 3:
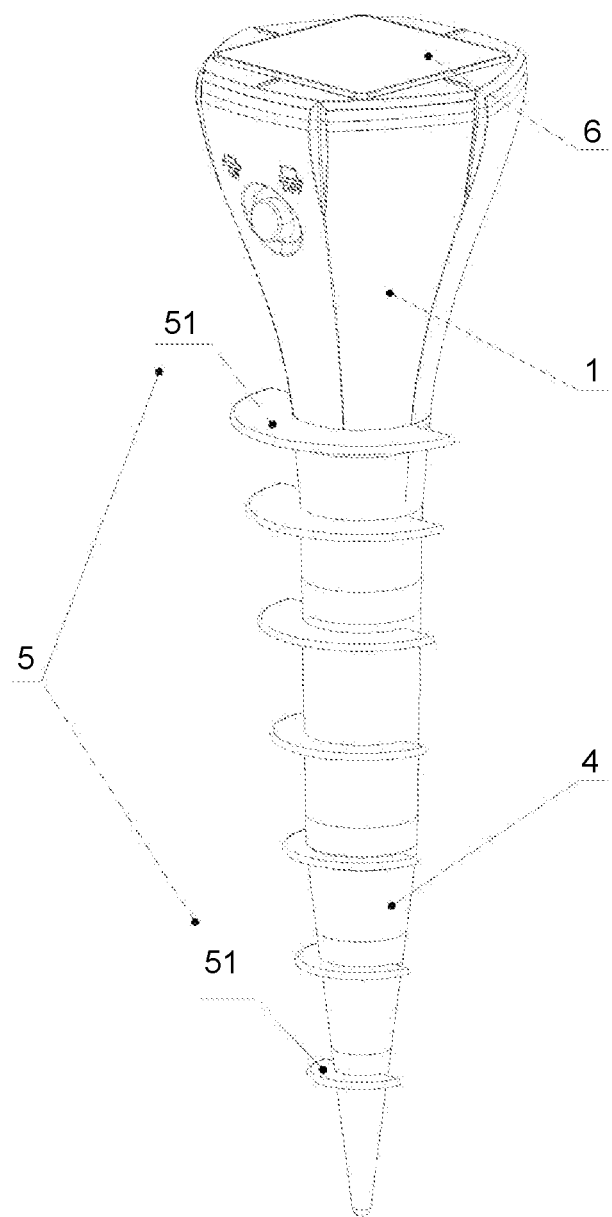
FIG. 3 is a schematic diagram of embodiment 1 in the present invention.
Figure 4:
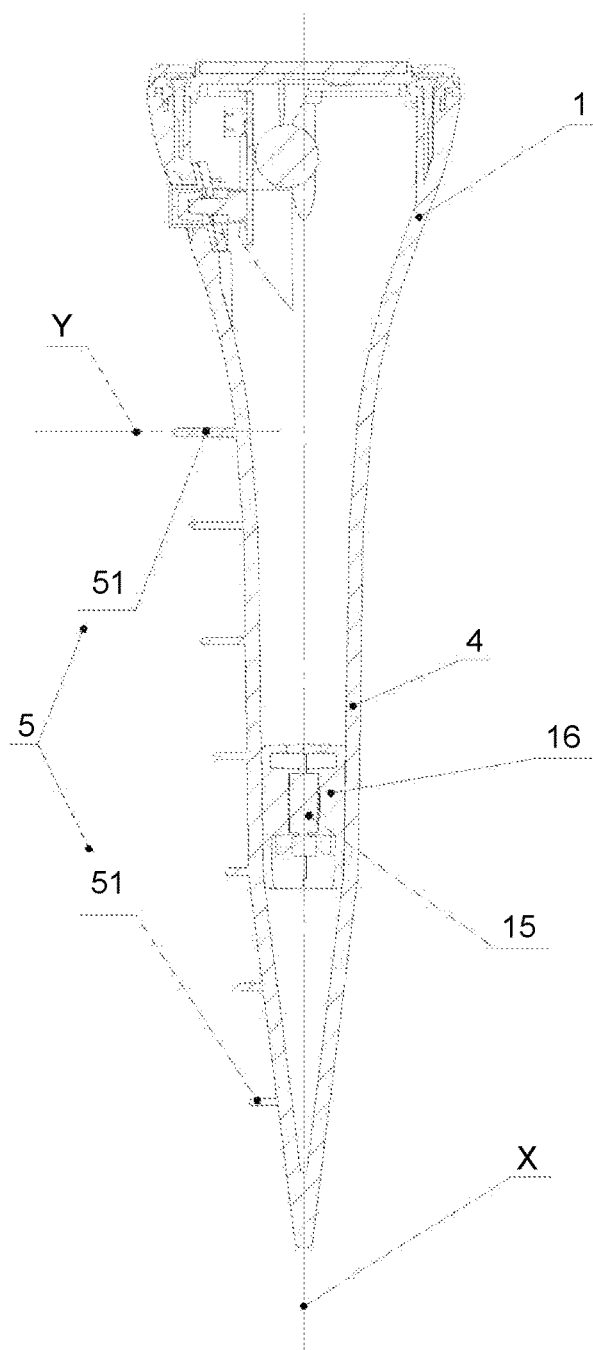
FIG. 4 is a cross-sectional view of Embodiment 1 of the present invention.

In this embodiment, as shown in FIG. 3 and FIG. 4, the tab groups 5 arranged in parallel in pairs and extending along the Y direction of the extension line will form longitudinal waves with the same propagation direction as the vibration direction of the tab 51 when vibrating, and longitudinal waves can propagate in solid, liquid, gas or their mixture, so the propagation range of the ultrasonic waves in the soil can be expanded. The tab group 5 can also increase the contact area between the animal repelling device and the soil, so that the animal repelling device is more stable after being inserted into the soil, and is not easy to overturn.

Figure 2:
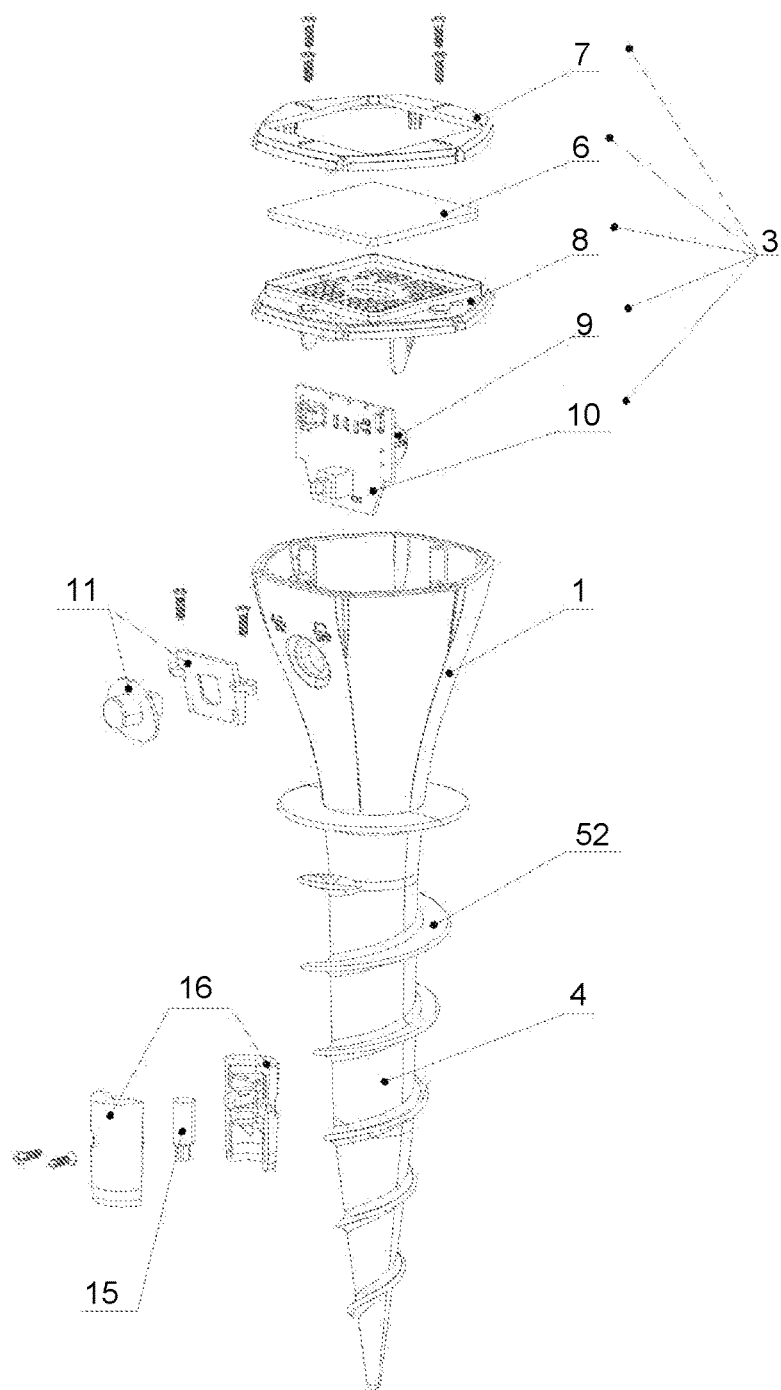
FIG. 2 is a structural explosion diagram of an animal repelling device of the present invention.
Figure 5:
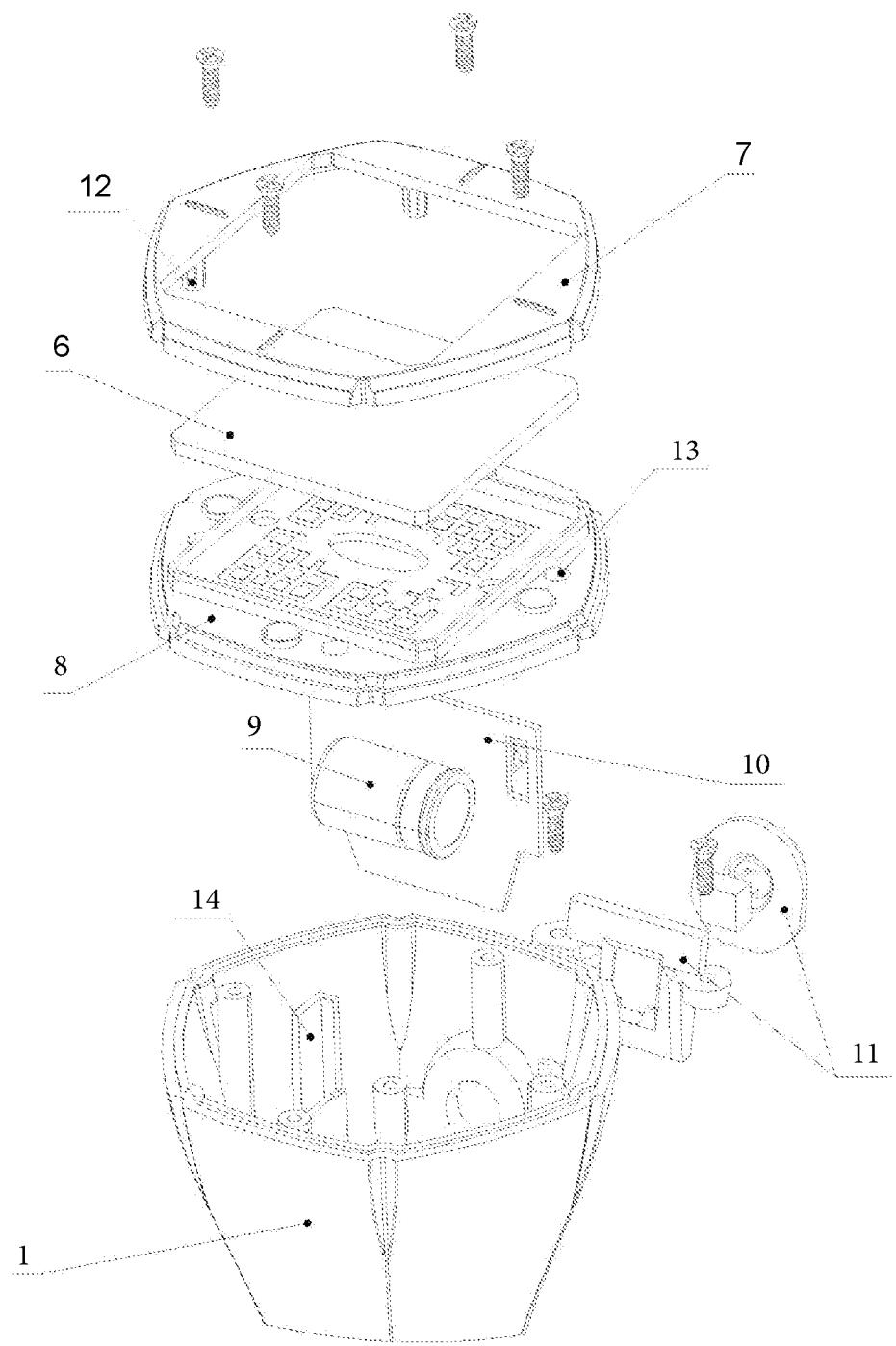
FIG. 5 is a schematic structural diagram of the power supply device in the present invention.

In this embodiment, as shown in FIGS. 2 and 5, the power supply system 3 is arranged above the connecting rod 1, which is preferably a solar power supply system, and includes a solar panel 6, an upper cover 7, a base 8, an energy storage battery 9, a control circuit board 10 and a button assembly 11, wherein the upper cover 7 is provided with a protrusion 12, the base 8 is formed with a groove 13 matched with the protrusion 12, and the solar panel 6 is arranged on the upper cover. The upper cover 7 forces the protrusion 12 to snap into the groove 13 by pressing, so that the upper cover 7 and the base 8 form a tight connection, thereby fixing the solar panel 6. The base 8 is fixedly connected with the connecting rod 1 by screws, and the connecting rod 1 is internally provided with a clamping seat 14 for the control circuit board 10 to be placed, and the control circuit board 10 is clamped in the clamping seat 14, and the button assembly 11 is connected with the connecting rod 1 by screws.

In this embodiment, the power supply system 3 is set as a solar power supply system, which can effectively reduce energy consumption, make full use of the sunlight to store energy in the daytime, and then supply power to the sound wave generator 2 through the energy storage battery 9 at night. The power source of the power supply system 3 is safe, environment-friendly and sustainable. Power supply system 3 mostly adopts the connection relationship of card slot, card seat and screw, which has a stable, reliable and compact structure, and it is not easy for the device to fall apart due to long-term vibration.

Figure 6:
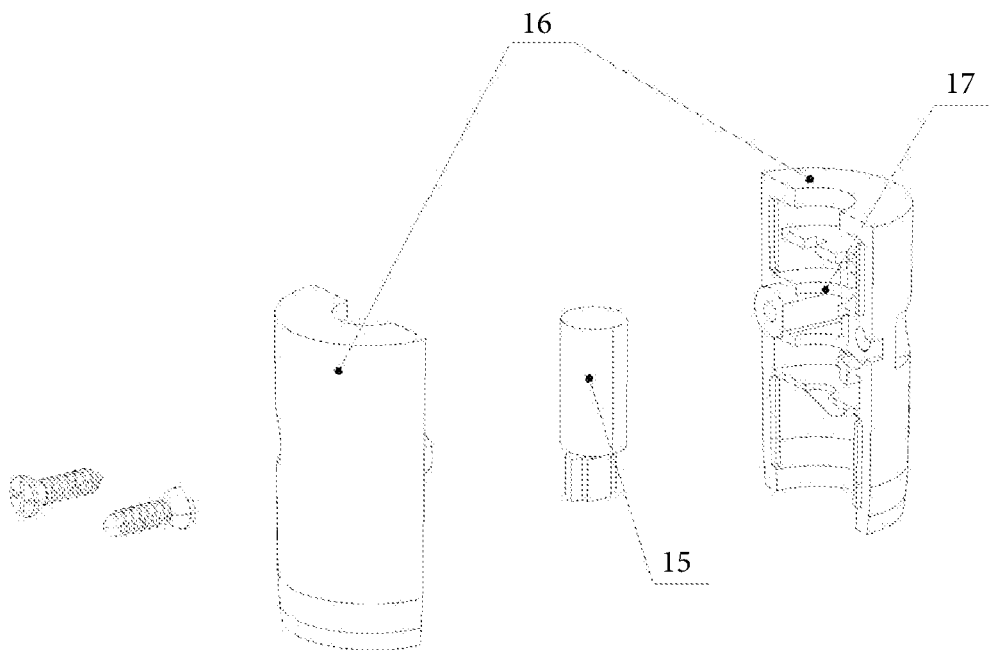
FIG. 6 is a schematic structural diagram of an ultrasonic device in the present invention.

In this embodiment as shown in FIG. 4 and FIG. 6, the sound wave generator 2 is arranged inside the insertion end 4 and closely adheres to the inner surface of the insertion end 4. The sound wave generator 2 is preferably a vibration motor device, including a motor 15 and a motor mounting seat 16, wherein the motor mounting seat 16 is provided with a mounting slot 17 which can accommodate the motor 15, and the motor 15 is mounted in the mounting slot 17. Wherein, the outer surface of the motor mounting seat 16 is set to fit the inner surface of the insertion end 4, and the motor mounting seat 16 is clamped into the insertion section 4 through clamping, so that the outer surface of the motor mounting seat 16 closely fits the inner surface of the insertion end 4.

In this embodiment, the outer surface of the motor mounting base 16 is closely attached to the inner surface of the insertion end 4, so that the motor 15 can drive the insertion end 4 to vibrate at the same time, thereby driving the tab group 5 to vibrate, thereby generating ultrasonic waves which can repel away animals.

Figure 7:
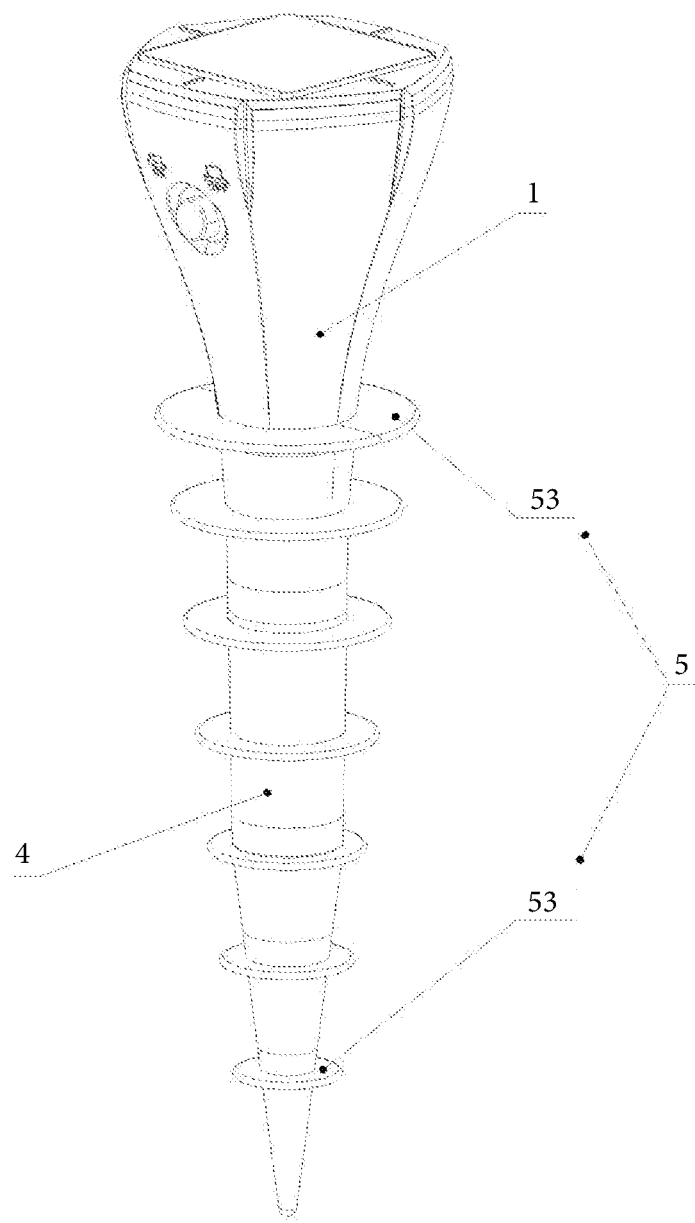
FIG. 7 is a schematic diagram of Embodiment 3 in the present invention.
Figure 8:
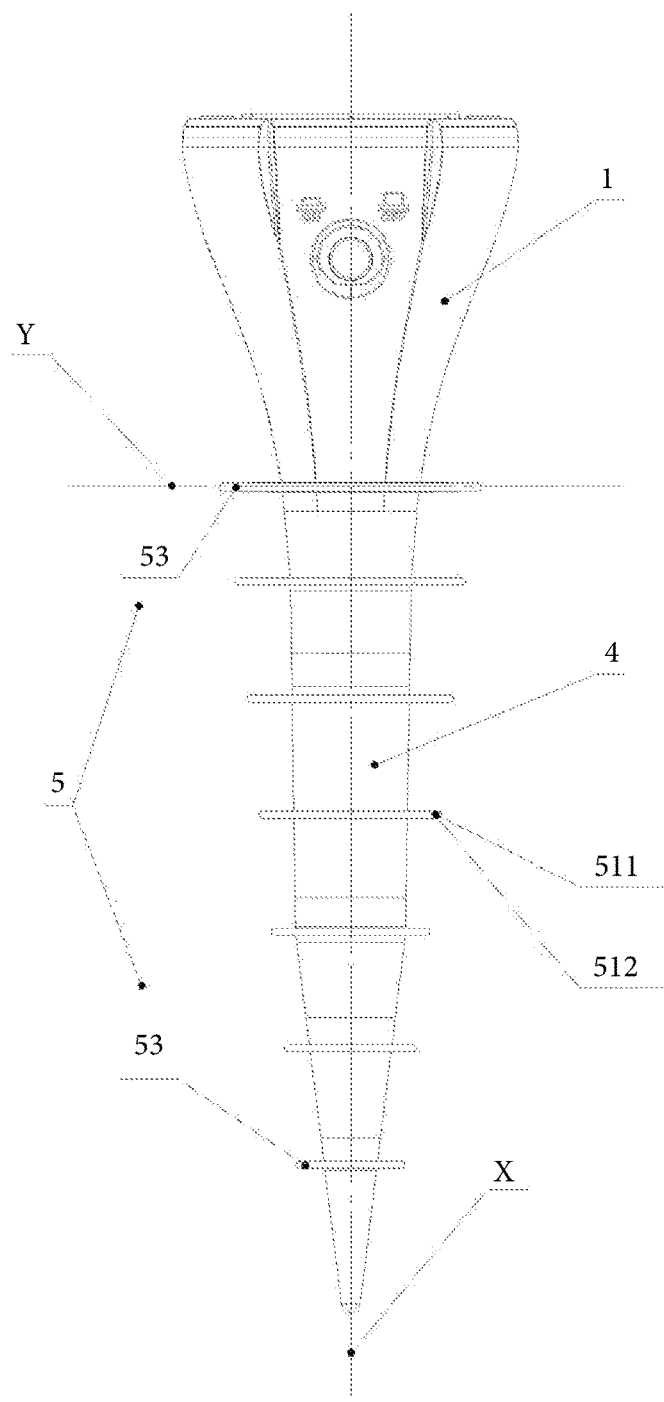
FIG. 8 is a front view of Embodiment 3 in the present invention.

In Embodiment 2, according to the animal repelling device according to Embodiment 1, as shown in FIGS. 7 and 8, the tab 51 has a first end 511 and a second end 512. When the first end 511 and the second end 512 are on the same circumferential surface and extend toward each other around the insertion end surface, the first end 511 and the second end 512 overlap to form a complete circular tab 53.

In this embodiment, forming a complete circular tab can further increase the propagation of ultrasonic waves generated during vibration.

Figure 9:
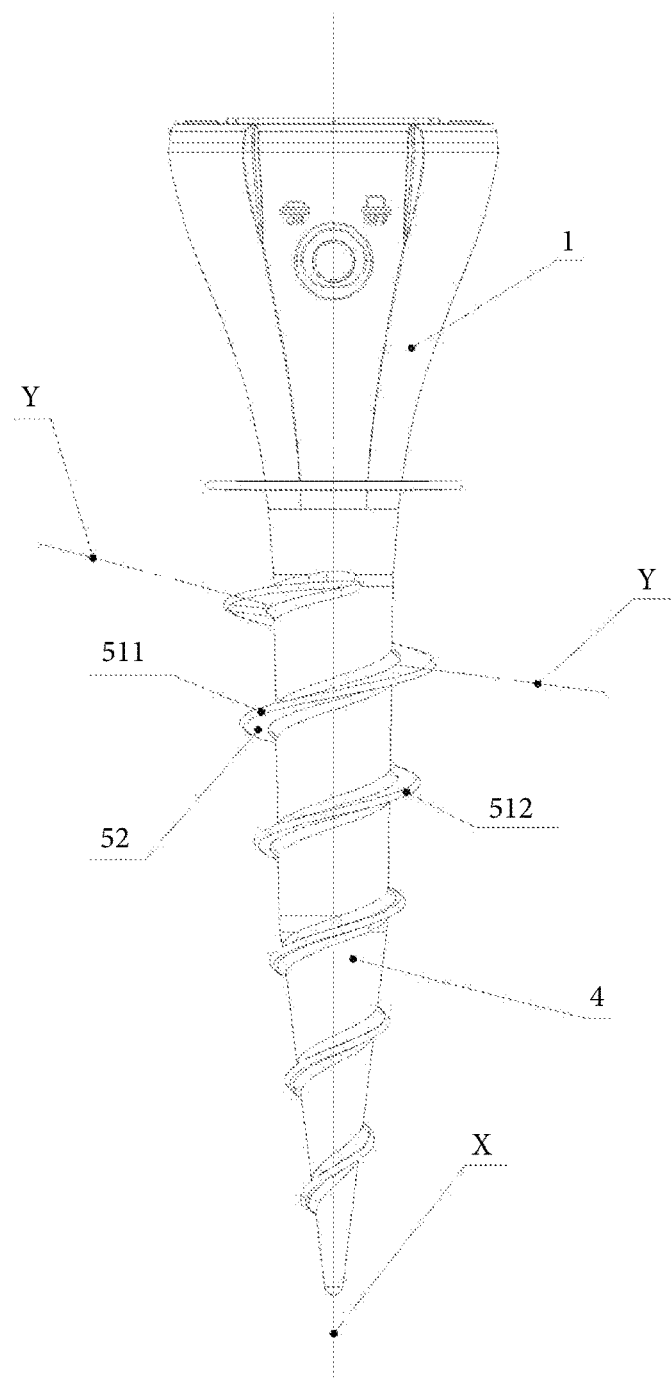
FIG. 9 is a front view of Embodiment 4 in the present invention.

In Embodiment 3, the animal repelling device according to Embodiment 1, as shown in FIGS. 1 and 9, the tab 51 has a first end 511 and a second end 512, and when the first end 511 and the second end 512 are on different circumferential surfaces and extend toward each other around the surface of the insertion end 4, a screw-shaped tab 52 is formed.

In this embodiment, the screw-shaped tab 52 can also generate longitudinal waves through vibration, and the screw-shaped tab can make the animal repelling device more labor-saving when inserted into the soil, and it is not easy to overturn after being inserted into the soil, so that the stability is better.

Figure 10:
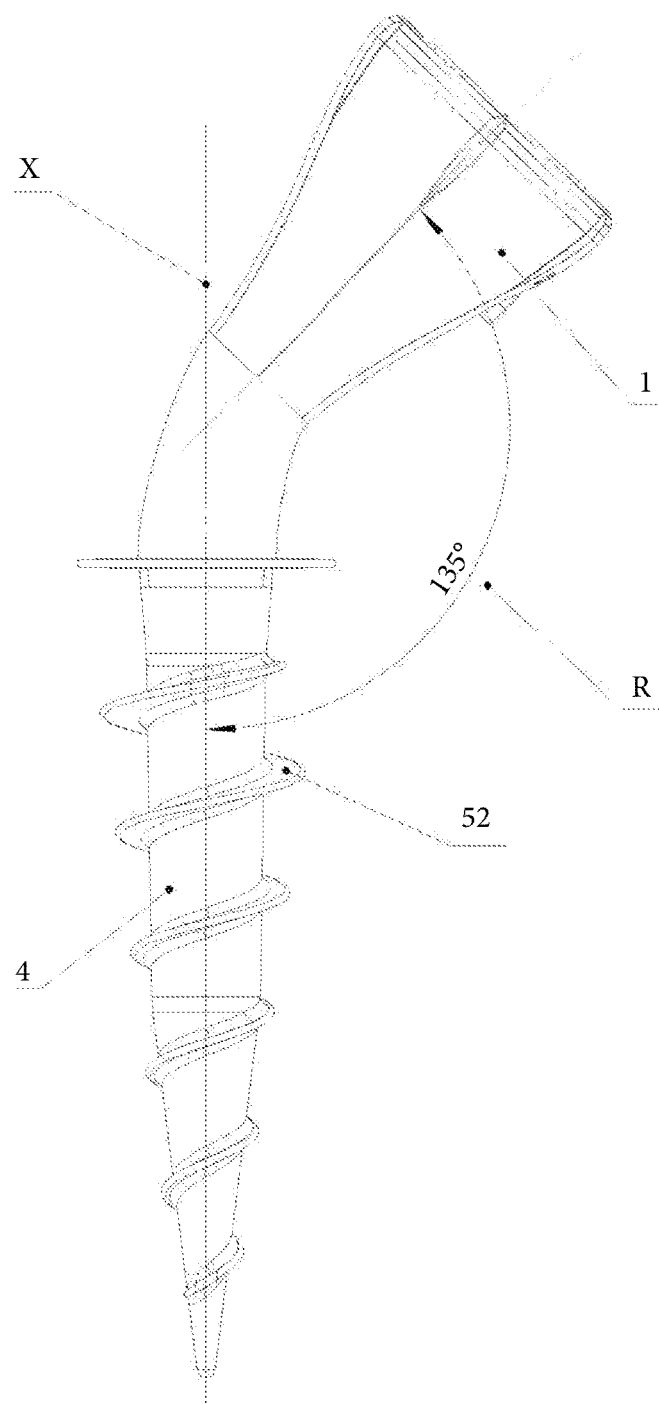
FIG. 10 is a side view of Embodiment 5 of the present invention.

In Embodiment 4, according to the animal repelling device according to Embodiment 3, as shown in FIG. 10, the center line X of the insertion end 4 forms an included angle R with the axis of the connecting rod 1, and the included angle R is 135°.

In other non-limiting embodiments, the included angle R may be 0°<R'<180°.

Figure 11:
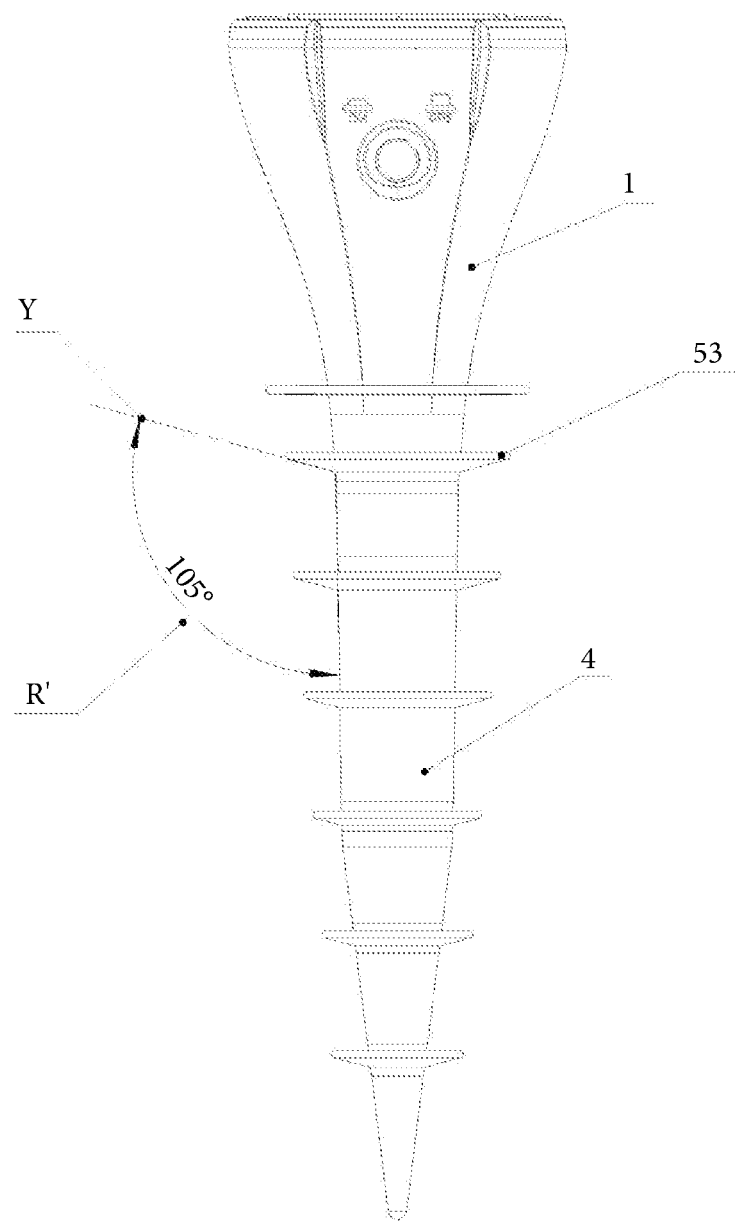
FIG. 11 is a front view of Embodiment 6 of the present invention.

In Embodiment 5, according to the animal repelling device according to Embodiment 3, as shown in FIG. 11, the extension line Y of the tab 51 forms an included angle R' with the surface of the insertion end 4, and the included angle R' is 105°.

In other non-limiting embodiments, the included angle R' may be 0°<R'<180°.

The technical means disclosed in the solution of the present invention is not limited to the technical means disclosed in the above embodiments, but also includes the technical solution composed of any combination of the above technical features. It should be pointed out that for those skilled in the art, several improvements and embellishments can be made without departing from the principle of the present invention, and these improvements and embellishments are also regarded as the protection scope of the present invention.

What is claimed is:

1. An animal repelling device, comprising: a connecting rod, a sound wave generator, wherein the sound wave generator includes a motor and a motor mounting seat, a power supply system, and an insertion end, wherein a center line (X) is defined along an insertion direction of the insertion end, and a surface of the insertion end is provided with a tab group; the tab group is arranged on the surface of the insertion end, and the tab group is composed of mutually parallel tabs extending outward from the surface of the insertion end; an extension direction defines an extension line Y, which forms an included angle with the center line X of the insertion end, and the tabs are distributed around the surface of the insertion end, and wherein an outer surface of the motor mounting seat is attached to an inner surface of the insertion end, and the motor drives and vibrates the insertion end at the same time.

2. The animal repelling device according to claim 1, wherein the tab has a first end and a second end, and when the first end and the second end are in a same circumferential surface and extend toward each other around the surface of the insertion end, the first end and the second end overlap to form a complete circular tab.

3. The animal repelling device according to claim 1, wherein the tab has a first end and a second end, and when the first end and the second end are in different circumferential surfaces and extend toward each other around the surface of the insertion end, a screw-shaped tab is formed.

4. The animal repelling device according to claim 1, wherein the center line (X) of the insertion end forms an included angle (R) with an axis of the connecting rod, and the angle range of the included angle (R) is 08<R<180°.

5. The animal repelling device according to claim 1, wherein the extension line (Y) of the tab forms an included angle (R') with the surface of the insertion end, and the angle range of the included angle (R') is 08<R'<180°.

6. The animal repelling device according to claim 1, wherein the center line (X) of the insertion end is parallel or coincident with the axis of the connecting rod.

7. The animal repelling device according to claim 2, wherein the center line (X) of the insertion end is parallel or coincident with the axis of the connecting rod.

8. The animal repelling device according to claim 3, wherein the center line (X) of the insertion end is parallel or coincident with the axis of the connecting rod.

* * * * *